United States Patent
Wakefield

(10) Patent No.: US 10,698,301 B2
(45) Date of Patent: Jun. 30, 2020

(54) SURVEILLANCE APPARATUS

(71) Applicant: BAE SYSTEMS plc, London (GB)

(72) Inventor: Robin Julian Wakefield, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/335,161

(22) PCT Filed: Sep. 18, 2017

(86) PCT No.: PCT/GB2017/052758
§ 371 (c)(1),
(2) Date: Mar. 20, 2019

(87) PCT Pub. No.: WO2018/055344
PCT Pub. Date: Mar. 29, 2018

(65) Prior Publication Data
US 2019/0243220 A1 Aug. 8, 2019

(30) Foreign Application Priority Data

Sep. 21, 2016 (EP) .................... 16275139
Sep. 21, 2016 (GB) .................... 1616032.7

(51) Int. Cl.
G03B 17/56 (2006.01)
H02G 11/02 (2006.01)
(Continued)

(52) U.S. Cl.
CPC ........... *G03B 17/561* (2013.01); *F16M 11/24* (2013.01); *H02G 11/02* (2013.01); *H04N 7/185* (2013.01); *F16M 2200/02* (2013.01)

(58) Field of Classification Search
CPC ....... G03B 17/561; H02G 11/02; H04N 7/185
See application file for complete search history.

(56) References Cited

U.S. PATENT DOCUMENTS 3,434,254 A 3/1969 Rubin
3,503,164 A * 3/1970 Medal .................... E04C 3/005
52/108

(Continued)

FOREIGN PATENT DOCUMENTS

DE 29819849 U1 5/1999
EP 1863153 A2 12/2007
(Continued)

OTHER PUBLICATIONS

International Search Report and Written Opinion received for PCT Application No. PCT/GB2017/052758, dated Dec. 12, 2017. 11 pages.
(Continued)

*Primary Examiner* — Christopher K Peterson
(74) *Attorney, Agent, or Firm* — Finch & Maloney PLLC

(57) ABSTRACT

There is disclosed a surveillance apparatus comprising: —a retractable support member; the retractable support member comprising an upper section and lower section, wherein at least one of the upper or lower sections are constructed from at least one deformable material, wherein upper and lower sections are arranged to form a substantially rigid cavity throughout their length, and are retained by a retaining means, wherein said retractable support member comprises a first end and a second end;
   a housing;
   a spooling mechanism mounted at the housing, and being rotatable relative to the housing, and being attached to the second end of the retractable support member, the spooling mechanism being:
   operable to rotate in a first direction to convert the retractable support member from a spooled condition to an extended condition and thereby pay-out the retractable support member from the housing,
(Continued)

Figure 1A:
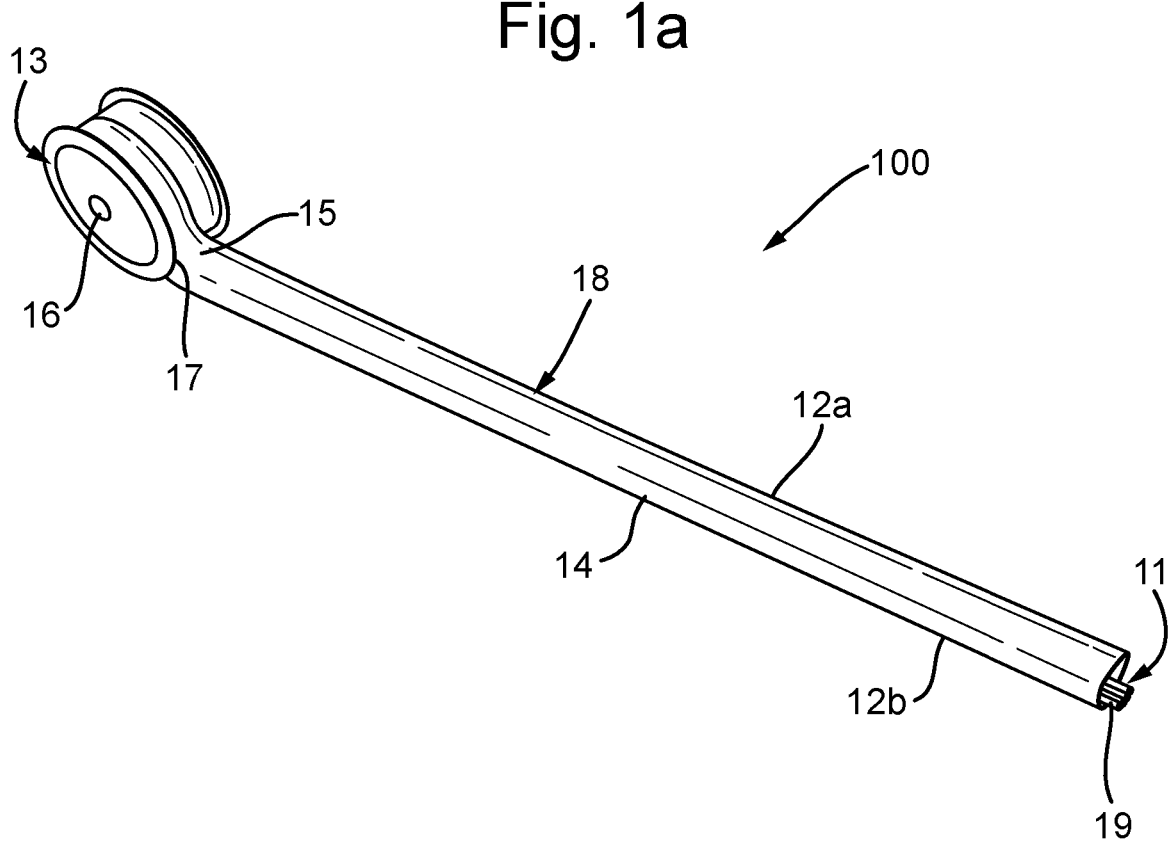

operable to rotate in a second direction opposite to the first to convert the retractable support member from the extended condition to the spooled condition and thereby retract the retractable support member into the housing, wherein coiling the retractable support member forces the deformable material to deform causing the upper section and lower section together to become substantially flat as it is spooled.

19 Claims, 2 Drawing Sheets

(51) Int. Cl.
  *F16M 11/24* (2006.01)
  *H04N 7/18* (2006.01)

(56) References Cited

U.S. PATENT DOCUMENTS

| | | |
|---|---|---|
| 3,524,190 A | 8/1970 | Killion et al. |
| 3,978,489 A | 8/1976 | Kurland et al. |
| 2011/0012003 A1* | 1/2011 | Woodruff .............. E04H 12/185 248/404 |
| 2017/0268700 A1* | 9/2017 | Farkas ................... F16M 11/18 |

FOREIGN PATENT DOCUMENTS

| | | |
|---|---|---|
| FR | 2814218 A1 | 3/2002 |
| WO | 2007030149 A2 | 3/2007 |
| WO | 2016046551 A1 | 3/2016 |
| WO | 2018055344 A1 | 3/2018 |

OTHER PUBLICATIONS

GB Search Report received for GB Application No. 16160327, dated Mar. 21, 2017. 4 pages.

Extended European Search Report received for EP Application No. 16275139.0, dated Feb. 28, 2017. 9 pages.

International Preliminary Report on Patentability received for PCT Application No. PCT/GB2017/052758, dated Apr. 4, 2019. 10 pages.

* cited by examiner

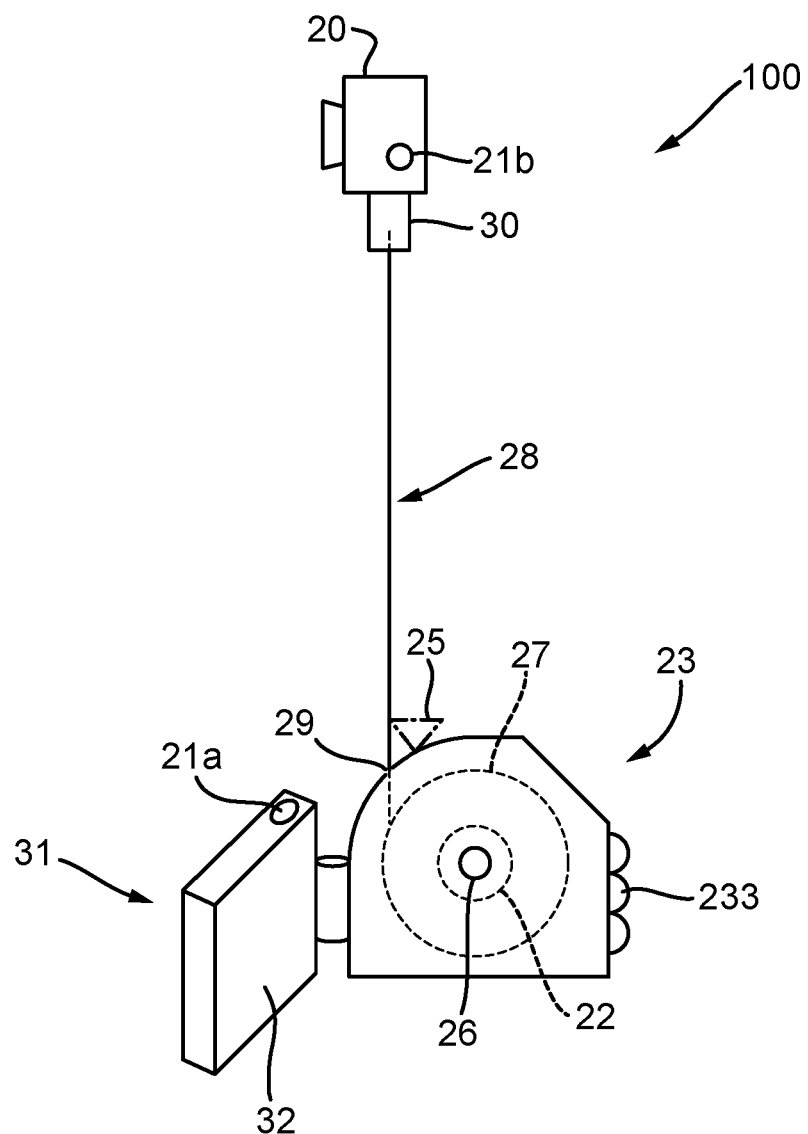

SURVEILLANCE APPARATUS

The present invention relates to surveillance apparatus.

It is known to provide a retractable support for attachment to an imaging device such as a digital camera, for capturing images of a scene or a video of a scene. Such supports enable the operator to capture images or video from viewpoints which may not be possible in the absence of such a support.

Often such supports have a telescopic mechanism for enabling the support to switch between a compressed and an extended condition. As such the supports include a retractable member comprising a series of coaxial tubular sub-members, each having decreasing girth compared to the preceding sub-member, and interconnected such that smaller girth sub-members may be sheathed inside their larger girth neighbours. Typically such supports can extend to a length of approximately one metre.

GB1416926 details a surveillance apparatus, utilising a wired feed between a sensor at one end of the apparatus and a human or other receiving device at the other. This surveillance apparatus utilises a single cambered support and as such is limited in its ability to support a mass at an extended length.

GB1416927 details a surveillance apparatus, utilising wireless technology to transfer the feed from a sensor at one end of the apparatus to a human or other receiving device at the other. As with GB1416926 this surveillance apparatus utilises a single cambered support and as such is limited in its ability to support a mass at an extended length.

According to the present invention there is provided a surveillance device comprising: —a retractable support member; the retractable support member comprising an upper section and lower section, wherein at least one of the upper or lower sections are constructed from at least one deformable material, wherein upper and lower sections are arranged to form a substantially rigid cavity throughout their length, and are retained to form the substantially rigid cavity by a retaining means, wherein said retractable support member comprises a first end and a second end;
a housing; a spooling mechanism mounted at the housing, and being rotatable relative to the housing, and being attached to the second end of the retractable support member, the spooling mechanism being:
operable to rotate in a first direction to convert the retractable support member from a spooled condition to an extended condition and thereby pay-out the retractable support member from the housing,
operable to rotate in a second direction opposite to the first to convert the retractable support member from the extended condition to the spooled condition and thereby retract the retractable support member into the housing, wherein spooling the retractable support member forces the at least one deformable material to deform causing the upper section and lower section together to become substantially flat as it is spooled. Such a surveillance apparatus may provide a lightweight support which offers the operator the option of using the surveillance device at a number of different displacements from the housing, and yet still provides for efficient stowage.

In a preferred arrangement a mounting bracket is attached to the first end of the retractable support member. This mounting bracket may be used to support a device capable of receiving or detecting environmental signals such as for example a sensor. Such a sensor may collect visual data, such as a camera, acoustic data, such as a microphone or both. Alternatively the sensor may simply provide environmental data relating to the area conditions, e.g. humidity, air pressure etc.

The mounting bracket may be a mount, such that a sensor may be reversibly attached to the mount, such as a slide or clip arrangement, further it may be mechanically attached to the mount. In one embodiment the first end may further comprise a releasable clamp, operable in a closed and open position, wherein when closed it holds the sensor to the retractable support member. The releasable clamp may be held under a spring bias, such as a crocodile clip or a mechanical means such as a screw clamp.

The use of upper and lower sections to form a cavity increases the rigidity and robustness of the retractable support member, while allowing for flexibility. The retaining means is used to retain the upper and lower sections. The retaining means may by rigid or flexible. This retaining means may comprise a flexible sheath, which envelopes the outside of the upper section and lower section, however might alternatively be a mechanical fixing or weld of the edges of the upper and lower sections. In a preferred embodiment the upper and lower sections are secured utilising a flexible sheath formed from a material such as "Ripstop", as this method increases durability by avoiding issues such as splitting, which are present with a delicate weld and avoids potential obstructions that may be present with a mechanical fixing means, such as a pin or rivet.

The formation of a substantially rigid cavity arrangement has been demonstrated to provide a device capable of supporting the mass of a sensor, for low weight per unit length, and to retain the rigidity over increased lengths.

Preferably, at least one of the retractable support members' upper or lower sections may be in the form of a cambered tape, more preferably both upper and lower sections are in the form of a cambered tape.

The spooling mechanism may comprise a spring biased to retract the support member and the surveillance apparatus may further comprise a selectively applicable brake for locking the member in position when a desired amount of retractable support member has been converted into an extended condition.

Where a spring bias is utilised, the retraction of the support member can be completed quickly by releasing the brake and allowing the spooling mechanism to retract the extended portion of the support member, as urged by the spring.

In an alternative arrangement a spring bias may be absent, allowing the force provided by either the upper section or lower section cambered member pushing against the upper section or lower section non-cambered member to force the support member to extend gradually, without the need for direct intervention. This allows an operator to utilise the selectively applicable brake when the support member has extended to the desired length or position. This means the operator can utilise the surveillance device without a need to reach to an inaccessible position or one handed.

The human interface may be at the housing.

As such the operator may monitor the output of the sensor remote from said sensor, either at the housing, or a non-contiguous human interface such as a separate tablet computer, which may be viewed by another operator.

The display screen may be pivotally attached at the housing in at least one axis, such that the display screen may switch between a readily observable condition and a stowed condition.

As such convenient viewing of the display screen can be achieved.

The electrical connection between the sensor and the human interface may comprise at least one wire, for example a coaxial or electrical wire, mounted on the retractable support member and running along a length of the retractable support member such that the wire can operably connect to the sensor at the first end of the retractable support member, and can thereby relay a signal from the sensor towards the human interface at the other. The wire may be secured to at least the upper or lower section of the retractable support member utilising an adhesive material such as laminate film, electrical tape or glue, enabling the wire to be held in place without impeding the spooling action when retracting the support member.

Alternatively at least the upper or lower section of the retractable support member is formed from an electrically conducting material. This may allow an electrical signal to be passed through either upper and/or lower section material, negating the need for a separate conductor wire. Such a material may include metal.

Further where a separate conductor wire is used, the upper and lower section materials by provide electrical shielding to the separate conductor wire.

Such a provision for relaying data from the sensor to the human interface can be readily assembled from available materials, and can provide for covert communications between the surveillance device and the interface.

The housing may be man-portable and comprise a grip.

As such, the apparatus can more conveniently be used manually. In general, the apparatus may be a handheld apparatus.

The retractable support member's upper and lower sections may be at least 30 mm wide, a camber radius of 15-25 mm, and a thickness of 0.3-0.5 mm.

As such, the retractable support member is able to support a load of 120 g at its first end, when extended out to a distance of 1.9 m, whereas at the same distance a prior art arrangement having only a lower section and no supporting retaining means can only support a load of 42 g.

The retractable support member may be provided with a low observable finish.

Such provision can tend to mitigate the risk of detection and so provide a support suited for covert operations. For example, the support member may be finished in a matte black paint and thereby reduce the risk of glint.

Figure 1B:
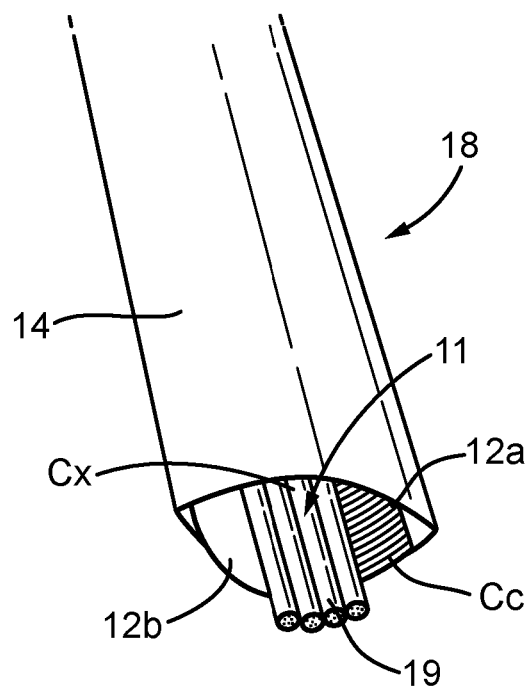

So that the invention may be well understood, at least one exemplary embodiment shall now be described with reference to the following figures, of which:

FIG. 1*a* shows a first surveillance apparatus according to the present invention;

FIG. 1*b* shows a cross section of the arrangement of the present invention.

FIG. 2 shows an example of the surveillance device in use and utilising the retractable support member in an extended position.

Referring to FIG. 1*a* there is shown generally at 100 a surveillance apparatus.

The surveillance apparatus 100 comprises a retractable support member 18. The retractable support member 18 extends into a rotatable spooling mechanism 16.

The retractable support member 18 once it is deployed to form the substantially rigid cavity 11 is then generally rigid along its length, but may readily be collapsed by the application of a suitable force.

More specifically, the retractable support member 18 comprises an upper section 12*a* and a lower section 12*b*, which are both generally formed from cambered metallic tape. Thus the tape has a convex Cx and a concave Cc surface, as shown in FIG. 1*b*. When in an extended condition, the retractable support member 18 may be readily collapsed by applying a positive bending moment over the length of the retractable support member 18 (i.e. the bending moment tends to compress the concave surface and stretch the convex surface) and subsequently providing the ability for the retractable support member 18 to be coiled.

The upper section 12*a* and lower section 12*b* of the present embodiment are made from steel and have a thickness of 0.4 mm, a width of 32 mm and a camber radius of 20 mm. The upper section and lower section (12*a*, 12*b*) are retained together by a retaining means 14, which in the preferred embodiment is a flexible sheath.

Following from research the applicant has determined that, when such a retractable support member 18 is provided in an extended condition the cavity 11 can be sufficiently rigid to support not only its own mass of its extended portion but also the mass of a surveillance sensor (not shown). Utilising a retaining means 14 to form a cavity 11 formed of upper section 12*a* and lower section 12*b*, the retractable support member 18 is given significant stability against lateral movement and improved ability to hold a load at the first end and at maximum extension.

Indeed, the applicant has ascertained that, for a surveillance sensor (not shown) of approximate mass 120 g, using the retractable support member 18 of the present embodiment, a tape length of 1.9 m may exist in the extended condition and feasibly support the surveillance sensor (not shown).

The retractable support member 18 may alternatively be provided in a spooled condition (or a 'reeled-in' condition) where the retractable support member 18 is wound in a spiral for more convenient storage.

The retractable support member 18 may exist in a combination of conditions: the retractable support member 18 may be provided in an extended condition, a spooled condition as well as the various stages of extension between as controlled by the operator.

The camber of the upper section 12*a* or lower section 12*b* is arranged such that as the retractable support member 18 is spooled, or reeled in, the concave surface Cc of the lower section 12*b* tends to be pressed against the convex Cx surface of the upper section 12*a*, forming a retractable support member 18 which is substantially flat. As the retractable support member 18 is reeled in it is spooled around the existing spooled retractable support member 18.

The rotatable spooling mechanism 16 comprises a rotatable drum 17, mounted within a housing (23, shown in FIG. 2). The second end of the retractable support member (not shown) is attached to the rotatable drum.

With reference to FIG. 1*b*, there is shown a retractable support member 18, comprising an upper section 12*a* and a lower section 12*b* and arranged in a deployed state to form a substantially rigid cavity 11. Within the cavity 11 a transmission media, such as a wire (or series of wires, optical fibres) 19 may span the length in order to connect the surveillance sensor (not shown) to the human interface (not shown). The upper section 12*a* and a lower section 12*b* are cambered in order to aid in the structure of the retractable support member 18 and held in position by a retaining means 14, which is formed from a flexible fabric sheath such as "Ripstop". The fabric sheath retains the upper section 12*a* and lower section 12*b* in place and further aids in the durability of the structural support member 18 by mitigating against knocks and scrapes which may dislodge the upper section 12*a* and lower section 12*b* and so cause the support to fail. The flexible fabric sheath 14 further aids in being a low observable surface, and mitigates reflection to prevent detection of the device during use; however this may still be achieved in alternative arrangements with the use of non-reflective paint.

With reference to FIG. 2, the housing 23 is shown with retractable support member 28 extended. The surveillance device 100 has a surveillance sensor 20, in the form of a camera at the first end of the retractable support member 28, reversibly mounted to a mounting bracket 30. The surveillance sensor 20 may transmit environmental data electronically to a human user via wires (FIG. 1a, 19) inside the cavity (FIG. 1b, 11) or alternatively via a wireless link 21b.

The housing 23 comprises a drum 22, in the form of a reel or spool and comprises a generally hollow cylinder 26 (the axis of which being coaxial with the axis of rotation of the drum 22). Within the hollow cylinder 26 there may be a coiled spring (not shown), formed from a strip of metal, which is at its innermost end fixed to the housing 23. The coiled spring (not shown) is wound around itself such that it spirals out from the innermost end, extending in a clockwise direction. The outermost end of the coiled spring (not shown) extends through an aperture in the cylinder 26 and is attached to the second end of the retractable support member 28.

Thus the second end of the retractable support member 28 is held close to the outer surface of the cylinder 26 and the retractable support member 28 faces the outer surface of the cylinder 26. From the second end retractable support member 28, the retractable support member 28 extends in a clockwise manner, overlapping itself to form a spool about the cylinder 26 and ultimately terminating at the distal end of the retractable support member 28.

A brake 25 is provide which may be applied, by sliding into contact with the retractable support member 28 or in an alternative arrangement the spooled retractable support member 27, so as to arrest the rotation of the drum or retractable support member 28 and lock the amount of retractable support member 28 paid out from the housing 23.

The drum 22 is held within the chamber of the housing 23 such that it is able to rotate relative to the housing 23. The housing 23 is provided with an aperture 29 to allow the retractable support member 28, to extend out from the general bounds of the housing 23.

A human interface device 31, which in the presented example is a display screen 32 attached to the housing 23 this allows the operator to view information collected by the surveillance sensor 20. The display screen 32 may, in an alternative example, be remote from the surveillance apparatus 100 and may include a wireless link 21a to the surveillance sensor 20.

The interfaces 21a and 21b may comprise a transceiver unit. Thus the wireless link S may adopt RF transmission protocols included in or associated with BLUETOOTH™ technology (including in particular the IEEE standard 802.15.1) or included in or associated with the IEEE 802.11 standards (referred to commonly as WIFI™). IEEE 802.11 standards would tend to be suited to relaying high definition video signals.

Still further, the wireless link S may be operable at frequencies in the range of 55-65 GHz and thereby enable high data rates and covert signal distribution (this band being strongly attenuated by air).

In the example arrangement provided, to effect such a conversion of the apparatus 100 between a state wherein the support member 28 is extended to when the support member 28 is fully retracted, the operator may simply disengage the brake 25 (if it is engaged) and then manually pay out the support member 28 to gradually displace the sensor 20 from the housing 23.

As the support member 28 is paid out, the operator overcomes the urging force of the spring (not shown) and causes the drum 22 to rotate relative to the housing 28.

Once a desired displacement (e.g. height) of the sensor 20 has been achieved, the brake 25 may be reapplied in order to hold the sensor 20 steady at that displacement and with the desired amount of support member 28 in the extended condition.

Consequently, with the sensor 20 and screen 32 allows the operator to survey a scene by monitoring environmental signals from a viewpoint that could otherwise be unachievable. For example the apparatus 100 may be extended in order to see over a wall or other obstacle.

Further, the apparatus 100 may readily be converted from such an extended condition back to the storage condition by releasing the brake 25 and allowing the spring (not shown) to rotate the spooling mechanism (not shown) and thereby draw the support member 28 back into its coiled condition.

Variants of the present invention may provide one or more of the following in combination or as an alternative to equivalents mentioned above.

For instance, the human interface 31 may be a simple control panel for issuing blind instructions to the sensor 20. For example, the control panel may be operable to issue a signal to the sensor 20 so as to start receiving or to capture an image.

Such a control panel may be suited to interfacing with the sensor 20 by means of a BLUETOOTH™ scheme.

The sensor 20 has been embodied herein as a camera or video camera. In further embodiments the sensor 20 may alternatively or additionally be capable of monitoring other environmental signals. The sensor 20 may therefore comprise a microphone, a thermometer or a magnetometer.

The invention claimed is:
1. A surveillance device comprising:
a retractable support member comprising an upper section and lower section, wherein at least one of the upper or lower sections are constructed from at least one deformable material, wherein the upper and lower sections are arranged to form a cavity throughout their length, said retractable support member further comprising a first end and a second end;
a retainer for retaining the upper and lower sections together, wherein the retainer is a flexible sheath, which envelopes the outside of the upper and lower sections;
a housing;
a spooling mechanism mounted at the housing, and being rotatable relative to the housing, and being attached to the second end of the retractable support member, the spooling mechanism further being
operable to rotate in a first direction to convert the retractable support member from a spooled condition to an extended condition and thereby pay-out the retractable support member from the housing, and
operable to rotate in a second direction opposite to the first direction to convert the retractable support member from the extended condition to the spooled condition and thereby retract the retractable support member into the housing, wherein coiling the retractable support member forces the deformable material to deform causing the at least one of the upper section and lower section to become substantially flat as it is spooled.

2. The device according to claim 1, wherein a mounting bracket is attached to the first end of the retractable support member.

3. The device according to claim 2, wherein a surveillance sensor is attached to the mounting bracket for receiving environmental signals.

4. The device according to claim 1, wherein at least one of the upper or lower sections is constructed from a material capable of electrical conduction.

5. The device according to claim 1, where the retractable support member comprises at least one wire.

6. The device according to claim 5, wherein the at least one wire is secured to the upper or lower section.

7. The device according to claim 1, wherein at least one of the upper or lower sections is cambered.

8. The device according to claim 1, wherein the second end of the support member comprises a releasable clamp, operable in a closed and open position, wherein when closed said releasable clamp holds a wire to the retractable support member.

9. The device according to claim 1, wherein the upper or lower sections are at least 30 mm wide, with a camber radius of 15-25 mm, and a thickness of 0.3-0.5 mm.

10. The device according to claim 1, wherein the retractable support member includes steel, and wherein the flexible sheath includes a fabric.

11. A retractable support member comprising: an upper section and lower section, wherein at least one of the upper or lower sections are constructed from at least one deformable material, wherein the upper and lower sections are arranged to form a substantially rigid cavity throughout their length, and are retained together by a retainer, wherein said retractable support member comprises a first end and a second end, wherein the retainer is a flexible sheath, which envelopes the outside of the upper and lower sections.

12. The device according to claim 11, wherein a mounting bracket is attached to the first end of the retractable support member.

13. The device according to claim 12, wherein a surveillance sensor is attached to the mounting bracket for receiving environmental signals.

14. The device according to claim 11, wherein at least one of the upper or lower sections is constructed from a material capable of electrical conduction.

15. The device according to claim 11, where the retractable support member comprises at least one wire.

16. The device according to claim 15, wherein the at least one wire is secured to the upper or lower section.

17. The device according to claim 11, wherein at least one of the upper or lower sections is cambered.

18. The device according to claim 11, wherein the second end of the support member comprises a releasable clamp, operable in a closed and open position, wherein when closed said releasable clamp holds a wire to the retractable support member.

19. The device according to claim 11, wherein both of the upper or lower sections are constructed from the at least one deformable material, such that the upper and lower sections are collapsible in response to being retracted.

\* \* \* \* \*